(12) United States Patent
Lin et al.

(10) Patent No.: US 11,449,073 B2
(45) Date of Patent: *Sep. 20, 2022

(54) SHARED VEHICLE OBSTACLE DATA

(71) Applicant: Zoox, Inc., Foster City, CA (US)

(72) Inventors: Michael Lin, Saratoga, CA (US);
Timothy David Kentley-Klay,
Stanford, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,403

(22) Filed: Feb. 3, 2020

(65) Prior Publication Data
US 2020/0174493 A1    Jun. 4, 2020

Related U.S. Application Data

(62) Division of application No. 15/673,728, filed on Aug. 10, 2017, now Pat. No. 10,558,224.

(51) Int. Cl.
*G05D 1/02* (2020.01)
*G05D 1/00* (2006.01)
*H04L 67/12* (2022.01)

(52) U.S. Cl.
CPC ......... *G05D 1/0285* (2013.01); *G05D 1/0088* (2013.01); *G05D 1/0212* (2013.01); *H04L 67/12* (2013.01)

(58) Field of Classification Search
CPC .. G05D 1/0285; G05D 1/0088; G05D 1/0212; H04L 67/12
See application file for complete search history.

(56) References Cited

U.S. PATENT DOCUMENTS

| | | |
|---|---|---|
| 7,425,903 B2 | 9/2008 | Boss et al. |
| 8,520,695 B1 | 8/2013 | Rubin et al. |
| 8,860,564 B2 | 10/2014 | Rubin et al. |
| 9,159,231 B2 | 10/2015 | Noh |
| 9,430,944 B2 | 8/2016 | Grimm et al. |
| 9,475,500 B2 | 10/2016 | Grimm et al. |

(Continued)

OTHER PUBLICATIONS

Roxin, "Inter-Vehicle Communications—Research Report", Oct. 2008, EU FP7 Asset WP2—for Deliverable 2.1—Sensor Fusion Model Specification and Prototyping, 18 pgs.

*Primary Examiner* — Hussein Elchanti
(74) *Attorney, Agent, or Firm* — Lee & Hayes, P.C.

(57) ABSTRACT

Systems, methods, and apparatuses described herein are directed to sharing vehicle obstacle data between vehicles and/or between vehicles and a central server. Vehicles may include sensors capturing data including, but not limited to, speed, direction, acceleration, deceleration, LIDAR data, RADAR data, SONAR data, camera data, GPS data, etc. In some implementations, acceleration of a vehicle above a threshold, such as braking or swerving, may trigger the transmission of sensor data to other vehicles and/or infrastructure devices. Vehicles that receive the transmitted data may determine a validity of the data, and may incorporate the data into operations of the receiving vehicle based at least in part on the validity of the data. Validity of the data may be based on sensor type, elapsed time or distance between detection of an obstacle or event and reception of data, a number of retransmissions, duplicative data, independent sources of data, etc.

20 Claims, 6 Drawing Sheets

(56) References Cited

U.S. PATENT DOCUMENTS

| | | | |
|---|---|---|---|
| 10,558,224 B1* | 2/2020 | Lin | G08G 1/165 |
| 2015/0254986 A1* | 9/2015 | Fairfield | G08G 1/161 |
| | | | 707/687 |
| 2016/0197484 A1* | 7/2016 | Jost | G01D 21/00 |
| | | | 307/116 |
| 2016/0330394 A1* | 11/2016 | Shahraray | H04W 4/70 |
| 2016/0334230 A1* | 11/2016 | Ross | G01C 21/3415 |
| 2017/0017734 A1 | 1/2017 | Groh et al. | |
| 2017/0018179 A1* | 1/2017 | Gutierrez | G08G 1/096725 |
| 2017/0023945 A1* | 1/2017 | Cavalcanti | G08G 1/0141 |
| 2017/0141873 A1* | 5/2017 | Mandeville-Clarke | |
| | | | G08G 1/202 |
| 2017/0255199 A1* | 9/2017 | Boehmke | G01S 7/4817 |
| 2017/0262709 A1* | 9/2017 | Wellington | G06K 9/6201 |
| 2018/0032076 A1* | 2/2018 | Lombrozo | B60W 30/16 |
| 2018/0040246 A1* | 2/2018 | Yonemura | G08G 1/161 |
| 2018/0053141 A1* | 2/2018 | Shydo, Jr. | G05D 1/0291 |
| 2018/0075538 A1* | 3/2018 | Konrardy | B60W 30/16 |
| 2018/0082494 A1* | 3/2018 | Rech | G01C 21/3415 |
| 2018/0204398 A1* | 7/2018 | Smith | G07C 5/0808 |
| 2018/0349784 A1* | 12/2018 | Zheng | G05D 1/0274 |
| 2019/0163176 A1* | 5/2019 | Wang | G05D 1/0061 |

* cited by examiner

SHARED VEHICLE OBSTACLE DATA

CROSS REFERENCE TO RELATED APPLICATIONS

This patent application is a divisional application of co-pending, commonly owned U.S. patent application Ser. No. 15/673,728, filed Aug. 10, 2017. Application Ser. No. 15/673,728 is fully incorporated herein by reference.

BACKGROUND

Modern vehicles increasingly include sensors that can monitor an environment traversed by a vehicle. Modern vehicles may further include communication systems that facilitate the transfer of data between vehicles and/or between remote computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
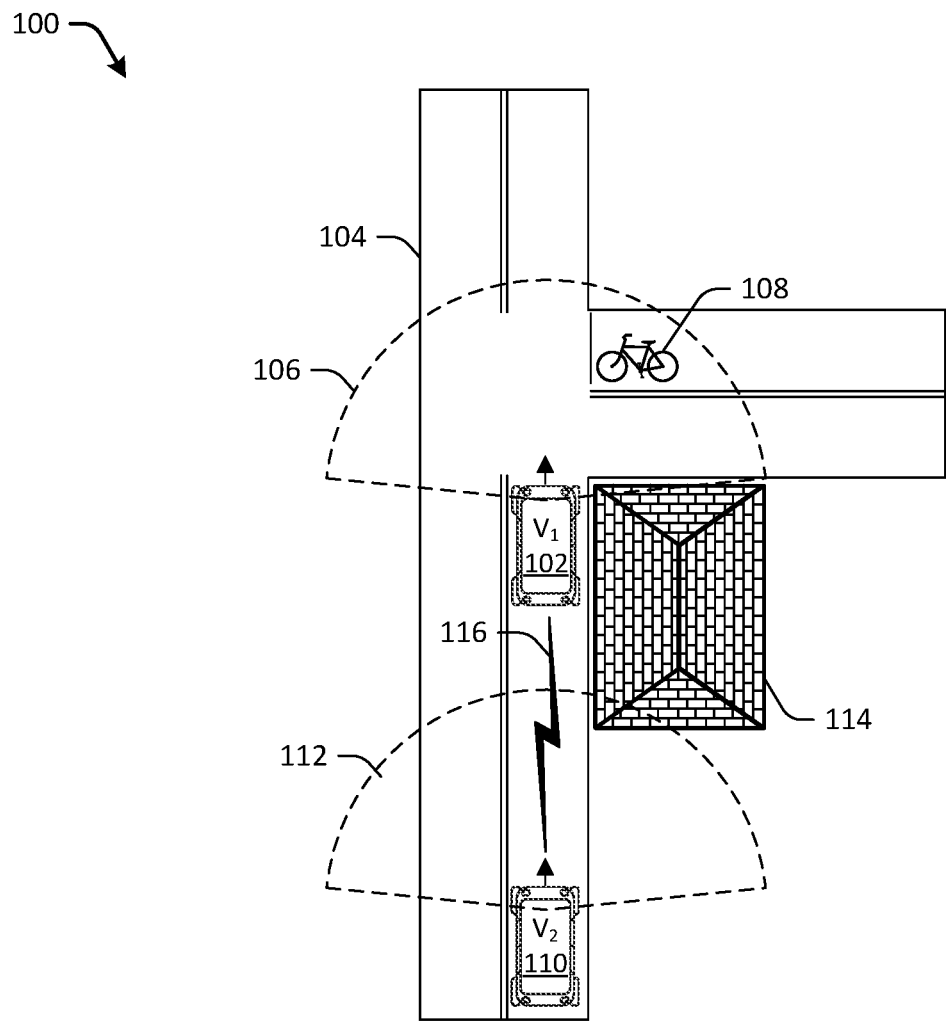
FIG. 1 illustrates an example environment for sharing obstacle data from a first vehicle to a second vehicle.

This disclosure describes methods, apparatuses, and systems for sharing vehicle obstacle data between vehicles and/or between vehicles and a central server. Vehicles may include sensors capturing data including, but not limited to, speed, direction, acceleration, deceleration, LIDAR data, RADAR data, SONAR data, camera data, GPS data, etc. Further, vehicles may continuously or periodically transmit data to other vehicles or infrastructure (e.g., the central server), and/or the vehicles may transmit data in response to a triggering event. In some implementations, a triggering event may include acceleration above a threshold (e.g., braking or swerving) or identification of an object or event (e.g., an obstacle such as a car, bicyclist, pedestrian, etc., or an accident or traffic violation).

Data may be received by a vehicle and incorporated into a perception system of the vehicle, for example, based on a confidence level associated with a validity of the data. In some embodiments, the validity of the data may be based on an origin of the data (e.g., a location/distance of the receiving vehicle to the source of the data), time (e.g., time passed between receiving the data and a time associated with observing the obstacle or event), a number of transmissions or retransmissions (e.g., data being transmitted from vehicle to vehicle to vehicle, and so on), a number of independent sources of the information (e.g., receiving data associated with an obstacle or event from multiple original sources), etc.

Data transmitted to other vehicles, infrastructure devices, or central servers may be subject to varying levels of processing by the transmitting vehicle prior to transmission. In some instances, the transmitting vehicle can transmit raw sensor data, or substantially raw sensor data, to receiving entities (e.g., vehicles, infrastructure devices, or central servers). For example, for a camera sensor capturing video data, the transmitting vehicle may transmit the video data to other receiving vehicles. In some instances, to reduce a bandwidth of data to be transmitted, the video data may be compressed, cropped, downsampled (e.g., transmitting every N-th frame, such as every $10^{th}$ frame), etc. In some instances, the transmitting vehicle may perform segmentation and/or classification on the video data to locate objects and/or to classify objects. Thus, the transmitted data may include cropped video data corresponding to a bounding box associated with an object represented in the video data, and/or an indication of the object and a location of the object (e.g. bounding boxes, icons, etc.), for example.

An amount of detail or specificity of the transmitted data may be based on a determination of the severity of the obstacle or event. In one example, a high level of detail may be provided for obstacles or events that may affect safety of vehicles and/or passengers (e.g., identification of a vehicle that may potentially collide with other vehicles), and in another example, a low level of detail may be provided for obstacles or events that do not affect vehicle safety (e.g., a location/identification of a pothole). In some instances, transmitted data may include indications about a state of the transmitting vehicle, such as a current position, velocity, and braking status, for example, to indicate a braking maneuver.

A vehicle may determine to transmit data to other vehicles and/or a central server based on a type of obstacle or event associated with the data. For example, static information (e.g., representing buildings, trees, parked cars, etc.) may be transmitted to a central server to be propagated to other vehicles by the central server. In another example, dynamic information (e.g., representing moving cars, bicycles, pedestrians, traffic lights, traffic, etc.) may be transmitted directly to other vehicles. In some instances, data associated obstacles or events that are transient in nature (e.g., that may be relevant for a relatively short period of time) may be more suitable to be transmitted to surrounding vehicles. For example, obstacles (which may include events) may include detection of a collision, prediction of a collision, detection of a traffic violation, etc.

In some instances, the vehicles may include autonomous vehicles. Further, the autonomous vehicles may include many sensors and may perform complex processing to perceive an environment surrounding the autonomous vehicle. For example, the autonomous vehicles may capture LIDAR data, RADAR data, SONAR data, camera data, GPS data, etc., or any data discussed herein, to determine a position of the autonomous vehicles, as well as objects such as cars and people in the environment. By transmitting sensor data captured by a first autonomous vehicle (e.g., a lead vehicle) to a second autonomous vehicle (e.g., a vehicle following the lead vehicle), the second autonomous vehicle may extend an effective range of sensors, and/or may incorporate the received sensor data into a perception system of the autonomous vehicle. In some instances, sensor(s) can be installed as infrastructure devices, such as in connection with traffic lights, stop signs, etc., to provide sensor data and/or communication capabilities to other vehicles, a central server, etc. Such infrastructure devices may also have compute capabilities to relay information regarding predicted collisions, traffic violations, etc based on the data collected. Thus, sharing sensor data between vehicles and/or infrastructure devices may improve the safety, trajectory planning, efficiency, etc. of autonomous vehicles traversing through environments.

As mentioned above, data received by an autonomous vehicle, for example, can be incorporated into a perception system of the autonomous vehicle. In one example, the received data may be based on LIDAR data, RADAR data, SONAR data, camera data, GPS data, etc. captured by a transmitting vehicle, and may include an indication of a disabled vehicle on a side of the road. The receiving autonomous vehicle may incorporate the received data into a planning system of the autonomous vehicle to move the autonomous vehicle in a lane away from an expected location of the disabled vehicle, without sensors of the autonomous vehicle detecting the obstacle. As the disabled vehicle comes into view of the sensors of the autonomous vehicle, and/or after a period of time or distance traveled, the autonomous vehicle may adjust a confidence level of the validity of the associated data. Further, the autonomous vehicle may "trust" the data captured by onboard sensors more than the received data. Thus, the autonomous vehicle receiving data transmitted from other vehicles may determine how much weight or trust to give the data (based at least in part on a confidence level of the validity of the data), and may determine actions of the vehicle based at least in part on the data and/or the confidence level associated with the data.

The methods, apparatuses, and systems described herein can be implemented in a number of ways. Example implementations are provided below with reference to the following figures. Although discussed in the autonomous vehicles, the methods, apparatuses, and systems described herein can be applied to a variety of vehicles, and is not limited to autonomous vehicles. Further, although the operations may be described with respect to one particular type of sensor, the operations discussed herein may be applied to any sensor type or data type. Additionally, the techniques described herein may be used with real data (e.g., captured using sensor(s)), simulated data (e.g., generated by a simulator), or any combination of the two.

FIG. 1 illustrates an example environment 100 for sharing obstacle data from a first vehicle to a second vehicle. The environment 100 includes a first vehicle 102 driving on a road 104. The first vehicle ($V_1$) 102 may be an autonomous vehicle including one or more sensors capturing data of the environment 100 represented by a first sensor area 106. Within the field of view of the first sensor area 106 is a bicycle 108.

A second vehicle 110 traverses the road 104. In some instances, the second vehicle ($V_2$) 110 may be an autonomous vehicle including one or more sensors capturing data of the environment represented by a second sensor area 112. In the example illustrated by the environment 100, the bicycle 108 is not within a field of view of the second sensor area 112 because the view may be blocked by a building 114.

In accordance with embodiments of the disclosure, the first vehicle 102 may capture data associated with the bicycle 108 and may transmit data 116 to the second vehicle 110, so that the second vehicle 110 may be aware of the bicycle 108 despite the bicycle 108 not being within a field of view of the second sensor area 112.

The data 116 may include any representation of the bicycle 108, and may be based on one or more sensors available to or installed on the first vehicle 102. In an example where the first vehicle 102 includes one or more cameras and one or more LIDAR sensors, the data 116 may include images and/or LIDAR datasets associated with the bicycle 108. Further, the first vehicle 102 may perform segmentation and/or classification on captured sensor data to segment information associated with the bicycle 108. The first vehicle 108 may determine that the captured data corresponds to the bicycle 108 by performing classification on the segmented data. Thus, the data 116 may include complex representations of the data to provide to the second vehicle 110.

As the second vehicle 110 receives the data 116 from the first vehicle 102, the second vehicle 110 can modify a trajectory of the second vehicle 110 based on the expectation that the bicycle 108 may be present on the road 102, despite the bicycle 108 not being in a field of view of the second sensor area 112. For example, the second vehicle 110 may reduce velocity, alter a position in a lane of the road 102, etc., based on the data 116 provided to the second vehicle 110.

In another example, the first vehicle 110 may turn a corner of the road 104 and encounter an obstacle, such as a couch (not illustrated in FIG. 1), in the middle of the road 104. To avoid hitting the obstacle, the first vehicle 102 may apply brakes to rapidly decelerate and/or swerve around the obstacle. In some instances, the lateral acceleration (e.g., swerving of the first vehicle 102) or longitudinal acceleration (e.g., panic braking) may be above a threshold amount of acceleration, which may correspond to a triggering event. In response to the triggering event, the first vehicle 102 may send the data 116 associated with the obstacle to the second vehicle 110. For example, the data 116 may include the presence of the obstacle, a classification of the obstacle, a location of the obstacle, a route taken by the first vehicle 102 to avoid the obstacle, etc. Thus, the second vehicle 110, upon receiving the data 116, can control motion of the second vehicle 110 based on the obstacle.

In some instances, a triggering event may include a collision (e.g., involving the first vehicle 102, or witnessed by the first vehicle 102), a traffic violation (e.g., determined by the perception system of the first vehicle 102), or an observation of vehicle and/or pedestrian behavior that may indicate a potential collision. In some instances, the data 116 may be transmitted to vehicles proximate to the first vehicle 102 (e.g., to the second vehicle 110), to emergency responders (e.g., police, fire department, ambulance), etc. In some instances, the first vehicle 102 may generate audio, lights, vibrations, etc., to alert a pedestrian regarding an obstacle (or a predicted collision, for example). In some examples, the second vehicle 110 may determine a potential collision or traffic violation of the first vehicle 102 and an obstacle. In such an example, the second vehicle 110 may generate audio, lights, vibrations, etc., to alert a pedestrian in proximity about the predicted collision, as well as convey the predicted collision to any other vehicle, such as the first vehicle 102 via any other vehicle or infrastructure device.

Figure 2:
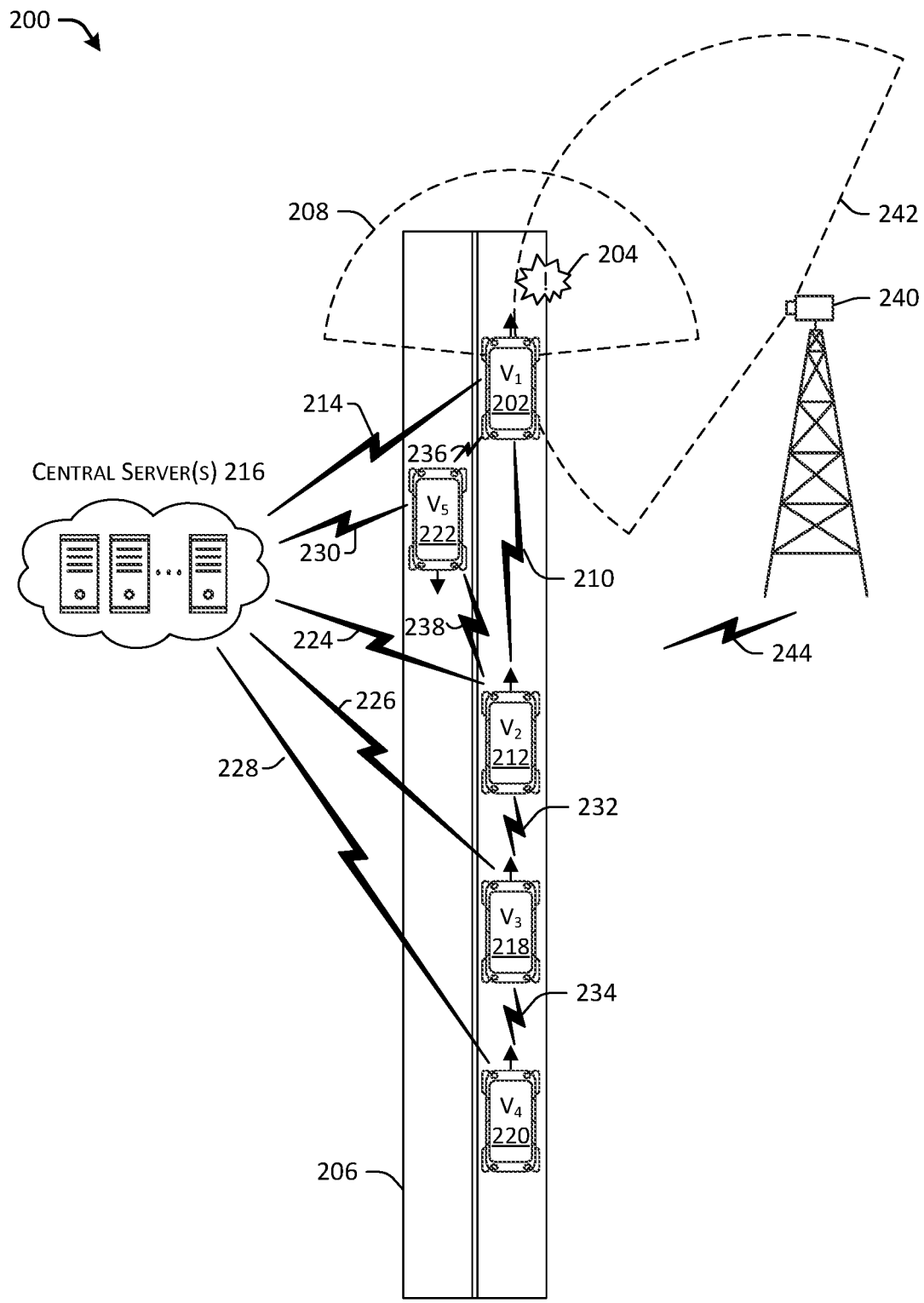
FIG. 2 illustrates another example environment for sharing obstacle data between vehicle(s), infrastructure device(s), and/or a central server.

FIG. 2 illustrates another example environment 200 for sharing obstacle data between vehicle(s), infrastructure device(s), and/or a central server. The example environment 200 may include a first vehicle ($V_1$) 202 encountering an obstacle 204 on a road 206. For example, the obstacle 204 may be within a field of view of a sensor area 208, representing a detection area of sensors of the first vehicle 202. In some instances, the first vehicle 202 can transmit a transmission 210 to a second vehicle ($V_2$) 212, and/or may transmit a transmission 214 to one or more central server(s) 216. In a case where the first vehicle 202 captures data associated with the obstacle 204, the first vehicle 202 can be considered to be an origin of the data (in contrast to vehicles and/or infrastructure devices that receive and transmit data captured by other devices, for example).

The environment 200 may further include a third vehicle ($V_3$) 218, a fourth vehicle ($V_4$) 220, and a fifth vehicle ($V_5$) 222. The central server(s) 216 may be in communication with the first vehicle 202, the second vehicle 212, the third vehicle 218, the fourth vehicle 220, and the fifth vehicle 222, via transmissions 214, 224, 226, 228, and 230, respectively. Further, the second vehicle 212 may be in communication with the third vehicle via a transmission 232. The third vehicle 218 may be in communication with the fourth vehicle 220 via a transmission 234. The fifth vehicle 222 may be in communication with the first vehicle 202 and the second vehicle 212 via transmissions 236 and 238, respectively. As may be understood, any number of vehicles may be present in the environment 200, and the vehicles and central server(s) 216 may communicate via any transmissions.

Transmissions may be broadcasted at large or may be addressed to specific destinations. For example, the transmission 210 may be specifically addressed to the second vehicle 212, or the transmission 210 may be received by any vehicle, and may be received by the second vehicle 212 by being in range of the first vehicle 202. In some instances, the transmissions 210, 214, 224, 226, 228, 230, 232, 234, 236, and/or 238 may be encrypted or encoded, and/or may addressed to individual vehicles or classes of vehicles, or may be received by any device capable of receiving such transmission. In some implementations, a transmitting vehicle may vary a transmission power of a transmission to increase or decrease a range of the transmissions to vehicles proximate to the transmitting vehicle.

As mentioned above, the first vehicle 202 may encounter an obstacle 204 and may transmit the transmission 210 to the second vehicle 212. As may be understood, the obstacle 204 may include any object, feature, or event that may be of interest to vehicles on the road 206. For example, the obstacle 204 can include, but is not limited to, buildings, cars, traffic violations, pleasant scenery, collisions, accidents, potholes, etc., and may include any static or dynamic object present in the environment 200. In some instances, the transmission 210 may be in response to detecting the obstacle 204. In some instances, the transmission 210 may include any data related to the first vehicle 202 and/or related to the obstacle 204. As discussed above, the first vehicle 202 can be considered to be the origin of the data included in the transmission 210 because the first vehicle 202 captured the data, for example. In some cases, the origin of the data can refer to a location of the first vehicle 202 upon capturing data associated with the obstacle 204, for example. In some cases, the origin of the data can refer to a location of the obstacle 204, for example, determined by the first vehicle 202.

For example, the transmission 210 may include data associated with the first vehicle 202, such as vehicle position (e.g., GPS position, location on a map, etc.), vehicle orientation, speed, heading, vehicle characteristics (e.g., fuel level, battery level, presence of vehicle occupants, tire pressure, oil pressure, etc.), acceleration, road conditions (e.g., surface type, frictional characteristics, etc.), vehicle route (e.g., actual route, planned route, etc.), etc. Further, the transmission 210 may include any information associated with the obstacle 204, such as a location of the obstacle 204, a speed/heading of the obstacle 204, a timestamp associated with capturing data associated with the obstacle 204, predicted movement of the obstacle 204, segmentation information (e.g., a two-dimensional or three-dimensional bounding box associated with the obstacle 204, classification information (e.g., identifying the obstacle)), etc. In some examples, the transmission 210 may include information regarding a traffic violation of another vehicle, or a predicted collision between another vehicle and obstacle 204.

In some examples, a transmission may comprise data which may vary from vehicle to vehicle. Such variation in data may be an amount of data, a quality of data, types of data (e.g. LIDAR data, image data, SONAR data, vehicle data, etc.), origin location of data (e.g. cameras at vehicle corners, cameras at a center of a vehicle hood, etc.), representations of data (e.g. bounding boxes, icons, animations, etc.), and the like. As a non-limiting example, the transmission 210 may comprise image data from newer, high resolution, cameras located on vehicle 202, whereas a transmission 232 (discussed below) may comprise image data from low resolution cameras located on vehicle 212. In such an example, the advantages of different sensor positions, sensor modalities, sensor qualities, etc. may be evaluated by more than one vehicle in a fleet of vehicles, while only requiring one vehicle to modify the data.

As the second vehicle 212 receives the transmission 210, the second vehicle 212 may transmit some or all of the data represented in the transmission 210 as the transmission 232 to the third vehicle 218. In turn, the third vehicle 218 may transmit some or all of the data represented in the transmission 232 as the transmission 234 to the fourth vehicle 220.

As transmissions are received by the various vehicles 212, 218, 220, and 222, each vehicle may determine a confidence level of a validity of the data, or a relevancy of the data to the individual vehicle. For example, a relevancy and/or validity of the data may be based in part on a time difference between the occurrence of the obstacle 204, detection of the obstacle 204, or a timestamp associated with the transmission 210. For example, as time progresses, the relevancy of data may decrease.

Similarly, the relevancy or confidence level may be based on a number of transmissions, and/or on a number of independent sources of the information. For example, the second vehicle 212 may receive an indication of the obstacle 204 via the transmission 210. In one example, the fifth vehicle 222 may have independently captured data associated with the obstacle 204, and may provide an indication of the obstacle 204 to the second vehicle 212 via the transmission 238. In such an implementation, the first vehicle 202 and the fifth vehicle 222 providing indications of the obstacle 204 may increase a relevancy, confidence level, or "trustworthiness" of the data associated with the obstacle 204.

In some instances, each vehicle may determine a relevancy or confidence level associated with the data associated with the obstacle 204. In some instances, a confidence level may be based on a type of sensor data captured. For example, image data may have a higher confidence level associated with the data relative to LIDAR data.

Vehicles may further have the capability to filter transmissions and/or to determine whether transmissions are unique or correspond to other transmissions. For example, the first vehicle 202 may provide an indication of the obstacle 204 to the fifth vehicle 222 and the second vehicle 212. The fifth vehicle 222 may transmit an indication of the obstacle 204 to the second vehicle 212. Upon receipt of transmission from the first vehicle 202 and the fifth vehicle 222 corresponding to the obstacle 204, the second vehicle 212 may determine that the information associated with the obstacle 204 received via the transmissions 210 and 238 correspond to the same obstacle 204.

As noted above, if information associated with the obstacle 204 is transmitted to the second vehicle 212, and the first vehicle 202 and the fifth vehicle 222 are independent sources of the information, then the second vehicle 212 may increase a confidence level of the accuracy of the information, as discussed herein.

In another example, receiving vehicles may determine that received information is not relevant to the operation of the vehicle. For example, if the first vehicle 202 transmits an indication that the first vehicle 202 is braking (e.g., as the transmission 236), and the indication is received by the fifth vehicle 222, the fifth vehicle 222 may disregard the transmission 236 because the fifth vehicle 222 is traveling in the road 206 in a direction opposite the direction of the first vehicle 202.

As discussed herein, the first vehicle 202 may determine to transmit some or all of the data associated with the obstacle 204 to one or more vehicles and/or the central server(s) 216. In some instances, upon receipt of the transmission 214, the central server(s) 216 may rebroadcast some or all of the information to one or more other vehicles via the transmissions 224, 226, 228, and 230.

In some instances, the environment 200 may include one or more sensors 240 (also referred to as an infrastructure device) deployed in the environment 200. For example, the sensor 240 may include one or more LIDAR sensor(s), image sensor(s), RADAR sensor(s), SONAR sensors, etc. In some instances, the sensor 240 may be deployed and/or installed on infrastructure components such as traffic lights, telephone poles, light poles, buildings, trees, stop signs, etc. In some instances, the sensor 240 may represent a vehicle including sensors that has been deployed to a location to function as a mobile sensor installation. The sensor 240 can be associated with a field of view of a sensor area 242, representing a detection area of sensors of the sensor 240. In some instances, the obstacle 204 may be in the sensor area 242. As discussed herein, the sensor 240 can transmit or receive any transmission(s) 244, which may represent data captured by the sensor 240 and/or data captured, transmitted, or received by any of the vehicles 202, 212, 218, 220, 222, and the central server(s) 216. In some instances, the sensor 240 can act as an intermediary to pass on information to other vehicles (e.g., the sensor can receive data from the first vehicle 202 and transmit the data to the third vehicle 218, etc.).

Figure 3:
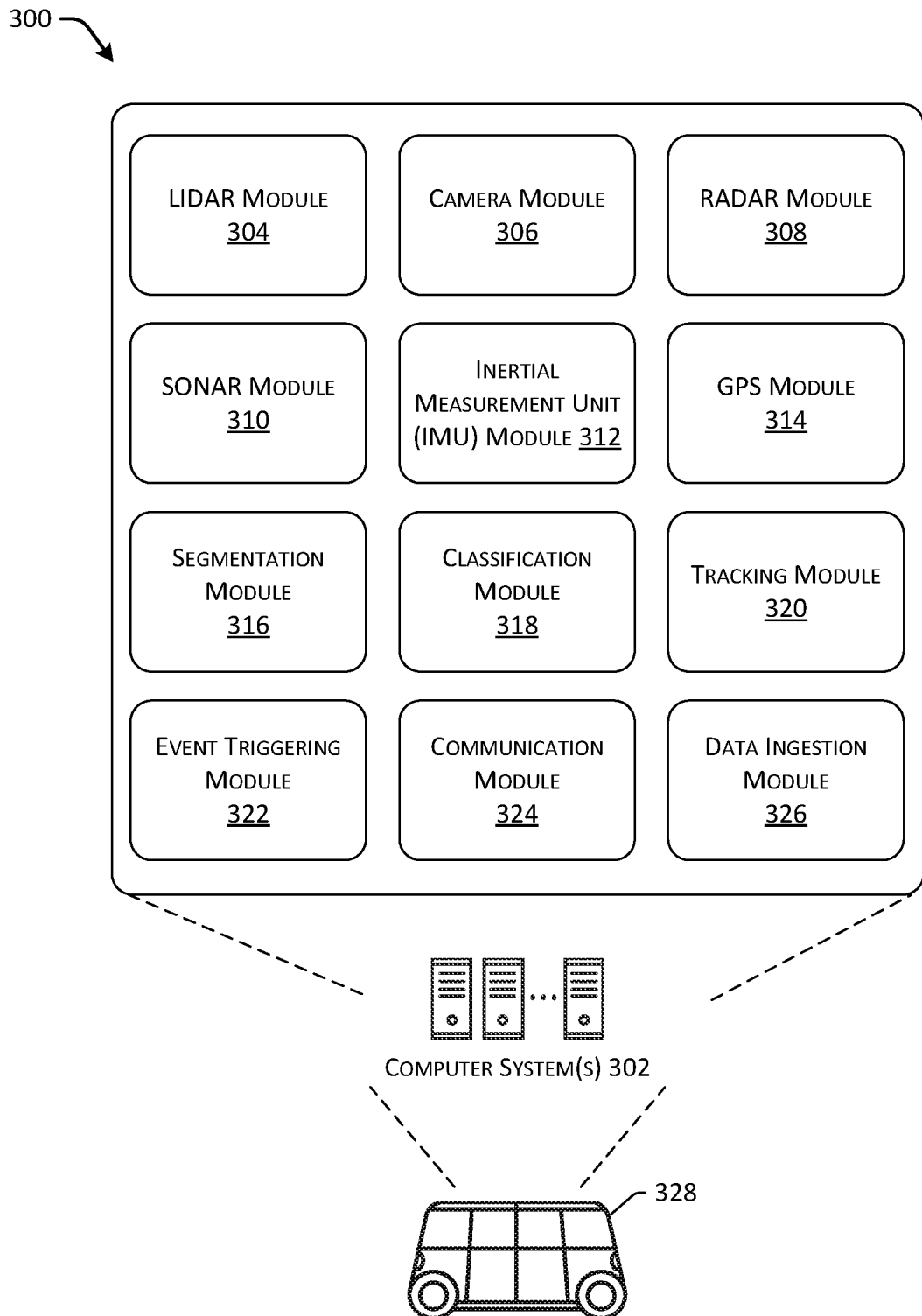
FIG. 3 illustrates an example architecture for sharing and receiving obstacle data between vehicles and/or a central server.

FIG. 3 illustrates an example architecture 300 for sharing and receiving obstacle data between vehicles and/or a central server, as described herein. For example, the architecture 300 may include one or more computer system(s) 302 including various hardware and/or software to implement aspects of the systems, methods, and apparatuses described herein. For example, the computer system(s) 302 may include a LIDAR module 304, a camera module 306, a RADAR module 308, a SONAR module 310, an inertial measurement unit (IMU) module 312, a GPS module, a segmentation module 316, a classification module 318, a tracking module 320, an event triggering module 322, a communication module 324, and a data ingestion module 326.

In some instances, the computer system(s) 302 may be embodied in an autonomous vehicle 328. In some instances, the computer system(s) 302 may provide perception and planning functionality for the autonomous vehicle 328. In general, the computer system(s) 302 may include LIDAR perception, RADAR perception, vision (camera) perception, acoustic perception, segmentation and classification, tracking and fusion, prediction/planning, communications to other vehicles and/or infrastructure, and ingestion of data from other vehicles and/or infrastructure.

Turning to the LIDAR module 304, the LIDAR module 304 may include one or more LIDAR sensors to capture LIDAR data, as described herein. Though illustrated in FIG. 3 as LIDAR data, such a LIDAR module 304 may comprise any type and number of depth sensors. In some instances, the LIDAR module 304 may include functionality to combine or synthesize LIDAR data from a plurality of LIDAR sensors to generate a meta spin of LIDAR data, which may refer to LIDAR data based on multiple LIDAR sensors. In the case of a meta spin of LIDAR data, the LIDAR module 304 may include functionality to determine a virtual origin of the meta spin data (e.g., a coordinate reference frame common to all LIDAR sensors) and perform a data transformation such that LIDAR data from each of the one or more LIDAR sensors is expressed with respect to the virtual origin. As may be understood in the context of this disclosure, the LIDAR module 304 may capture data and may transmit datasets to the computer system(s) 302 for subsequent processing. For example, data from the LIDAR module 304 may be included as data to be transmitted to other vehicles and/or infrastructure.

The camera module 306 may include one or more camera sensors to capture vision data for segmentation and/or classification. The camera module 306 may include any number and/or type of camera sensors. For example, the camera module 306 may include any color cameras, monochrome cameras, depth cameras, RGB-D cameras, stereo cameras, infrared (IR) cameras, ultraviolet (UV) cameras, etc. As may be understood in the context of this disclosure, the camera module 306 may capture data and may transmit datasets to the computer system(s) 302 for subsequent processing. For example, data from the camera module 306 may be included as data to be transmitted to other vehicles and/or infrastructure.

The RADAR module 308 may include one or more RADAR sensors to capture range, angle, and/or velocity of objects in an environment. As may be understood in the context of this disclosure, the RADAR module 308 may capture data and may transmit datasets to the computer system(s) 302 for subsequent processing. For example, data from the RADAR module 308 may be included as data to be transmitted to other vehicles and/or infrastructure.

The SONAR module 310 may include one or more speakers or sound emitters and one or more microphones (such as a microphone array) to capture acoustic information of objects in an environment. Additionally, or in the alternative, such a SONAR module 310 may comprise various ultrasonic transducers. For example, the SONAR module 310 may emit pulses of sound and may listen for echoes to determine a position and/or motion information associated with objects in the environment. As may be understood in the context of this disclosure, the SONAR module 310 may capture data and may transmit datasets to the computer system(s) 302 for subsequent processing. For example, data from the SONAR module 310 may be fused with data from the LIDAR module 304 (or with data from any module discussed herein), in order to more accurately segment objects and/or to determine information about the objects.

Data from the SONAR module 310 may be included as data to be transmitted to other vehicles and/or infrastructure.

The inertial measurement unit (IMU) module 312 may include one or more accelerometers, gyroscopes, and/or magnometers to determine forces such as angular spin, acceleration, etc. The IMU module 312 can further include processing to determine forces of the autonomous vehicle 328 corresponding to acceleration, braking, lateral acceleration (e.g., swerving, evasive maneuvers, etc.), velocity, and so on. Data from the IMU module 312 may be included as data to be transmitted to other vehicles and/or infrastructure.

The GPS (global positioning system) module 314 can include functionality to determine position, orientation, speed, heading, altitude, etc. of the autonomous vehicle 328. The GPS module 314 can, in part, determine a location of the autonomous vehicle 328 on a map, and provide location information to determine positions of obstacles or events in data captured by the one or more sensors of the autonomous vehicle 328. Data from the GPS module 314 may be included as data to be transmitted to other vehicles and/or infrastructure.

The computing system(s) 302 may include any number or type of other sensors suitable for use in an autonomous vehicle, for example. Various sensors may include, but are not limited to, ultrasonic transducers, wheel encoders, microphones, temperature sensors, humidity sensors, light sensors, etc.

In some instances, the LIDAR module 304, the camera module 306, the RADAR module 308, the SONAR module 310, the IMU module 312, and/or the GPS module 314 may provide one or more datasets to the computer system(s) 302 for combining and/or synthesizing the data for improved segmentation, perception, and/or planning. Further, some or all of the datasets may be transmitted to other vehicles (autonomous or otherwise) or infrastructure devices as raw data, or may be processed and a result based on the sensor data may be transmitted to other vehicles or infrastructure.

The computer system(s) 302 may further include simulated data that has been generated by a computer simulation algorithm, for use in part in testing. In some instances, the simulated data may include any type of simulated data, such as camera data, LIDAR data, RADAR data, SONAR data, inertial data, GPS data, etc. In some instances, computer system(s) 302 can utilize the simulated data for verifying an operation of the computer system(s) 302 and/or for training machine learning algorithms, as described herein.

The segmentation module 316 may include functionality to perform segmentation on data captured by one or more sensors of the autonomous vehicle 328. For example, the segmentation module 316 may input LIDAR data, camera data, RADAR data, either individually or in combination, to one or more algorithms (e.g., machine learning algorithms, region-growing algorithms, graph partitioning, and the like). For example, the segmentation module 316 (also referred to as a "segmenter") may perform segmentation to segment objects represented in the data for subsequent classification, perception, and/or planning. In some instances, the segmentation module 316 may determine two-dimensional or three-dimensional bounding boxes associated with objects. In some instances, the bounding boxes may be transmitted to other vehicles or infrastructure devices, and in some instances, the bounding boxes (e.g., segmentation information) may be used to crop or extract sensor data and provide extracted data to other vehicles or infrastructure devices. In some instances, any hardware and/or software configured to perform segmentation operations on data may be considered to be a segmenter.

The classification module 318 may include functionality to receive segmented data and to identify a type of object represented by the data. For example, the classification module 318 may classify one or more objects, including but not limited to cars, buildings, pedestrians, bicycles, trees, free space, occupied space, street signs, traffic lights, lane markings, etc. In some instances, the classification module 318 may perform classification on data to determine an occurrence of an event, such as a collision, a predicted collision, or a traffic law violation.

The segmentation module 316 and/or the classification module 318 may include any machine learning algorithms such as neural networks to perform operations of segmentation and classification, though any algorithm capable of segmenting and/or classification is contemplated.

As described herein, an exemplary neural network is a biologically inspired algorithm which passes input data through a series of connected layers to produce an output. One example of a neural network may include a convolutional neural network, or CNN. Each layer in a CNN may also comprise another CNN, or may comprise any number of layers. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

The tracking module 320 may include functionality to receive sensor information to determine and/or distinguish between static objects and dynamic objects. In some instances, the determination of static objects or dynamic objects may be included as shared vehicle data, as discussed herein. For example, the tracking module 320 may determine a velocity of a dynamic object and/or may determine and store a trajectory of the dynamic object over time. In some instances, the tracking module 320 may include a prediction algorithm that may predict a path of the object to be tracked based on previous motion of the object.

The event triggering module 322 may include functionality to determine an event that may trigger the transmission of data to other vehicles, as discussed herein. For example, the event triggering module 322 may determine, based on one or more of acceleration (e.g., lateral and longitudinal), brake status (e.g., pedal angle), steering angle(s), vehicle dynamics, etc. that an event has occurred. For example, if the autonomous vehicle 328 swerves, inducing accelerations above a threshold value, the event triggering module 322 may determine data to be transmitted regarding the obstacle, or data associated with the dynamic event. Further triggering events may include detections or predictions of collisions (such as may be performed by object tracking, etc.), detection of a traffic law violation, etc.

The communication module 324 may include functionality to transmit and/or receive data to and from various vehicles and/or infrastructure, as discussed herein. In some embodiments, the communication module 324 can include functionality to transmit and/or receive a plurality of wireless signals using any wireless protocols. For example, the communication module 324 can implement one or more technologies including 2G, 3G, 4G, LTE, Bluetooth, Bluetooth Low Energy, LoRaWi-Fi, WirelessHD, WiGig, Z-Wave, Zigbee, AM/FM, RFID, NFC, satellite radio, satellite phone, etc. Thus, the communication module 324 can implement GSM, UMTS, and/or LTE/LTE Advanced telecommunications technologies using terrestrial or satellite transceivers. In some instances, to increase throughput, the communication module 324 can utilize multiple-input/multiple-output (MIMO) technology.

The data ingestion module 326 may include functionality to receive transmission(s) from one or more other vehicles and/or infrastructure devices as discussed herein. In some instances, the data ingestion module 326 can receive transmissions and determine a confidence level associated with the data corresponding to the relevancy or validity of the data contained therein. For example, the data ingestion module 326 can assign a weight to received transmissions based on a distance of the receiving vehicle from a location associated with the source of the transmission. Further, the data ingestion module 326 can assign a weight based on an amount of time elapsed between a transmission time of the data (or original transmission time of the data) and a time associated with reception of the data. As discussed herein, transmissions may be facilitated by retransmissions via intermediate vehicles. Thus, the data ingestion module 326 may determine a confidence level associated with the data based on a number of hops or retransmissions of the data. In some instances, duplicate data (e.g., originating from the same source) may be discarded, and in some instances, data originating from different sources (e.g., two separate vehicles) but corresponding to the same obstacle or event may be trusted more by the data ingestion module 326.

In some instances, the data ingestion module 326 may treat received data, such as raw data received as shared vehicle data, as an input to the perception system of the autonomous vehicle 328. As data is ingested by the autonomous vehicle 328, an effective horizon (e.g., sensor horizon) of the autonomous vehicle 328 may expand, which may correspond to the sensor data (or indications based on the sensor data) shared among vehicles.

Further, if the autonomous vehicle 328 receives sensor data corresponding to a sensor not installed on the autonomous vehicle 328, the data ingestion module 326 may receive the data and provide the data as an input to a perception system. For example, received data may include LIDAR data (or high-resolution LIDAR data), while the autonomous vehicle 328 may not include a LIDAR sensor, or may have a lower-resolution LIDAR sensor compare to the received data. Thus, the data ingestion module 326 may incorporate sensor data into the computing system 302 even if sensors corresponding to that data are not present in the autonomous vehicle 328.

In some instances, the data ingestion module 326 may include functionality to receive data from one or more vehicles or infrastructure devices, for example, and to associate a time stamp and/or a confidence level associated with the data. In some example, the data ingestion module 326 may receive data and update a central map (e.g., at the central server 216) with the data corresponding to an event (e.g., an obstacle, traffic event, etc.). In some instances, the data ingestion module 326 may include a timer component with the data, which, upon expiration of the timer, may determine that the data has expired, is no longer relevant, or is associated with a lower confidence level, for example.

The autonomous vehicle 328 may further include a planning module, for example, to determine a trajectory of an autonomous vehicle. For example, a planning module generates a trajectory or commands to control the autonomous vehicle 328 to navigate an environment.

In some instances, the computer system(s) 302 may be embodied in the central server(s) 216 and/or in one or more infrastructure devices, such as the sensor 240. Additional details of the computer system(s) 302 are provided below in connection with FIG. 6.

Figure 4:
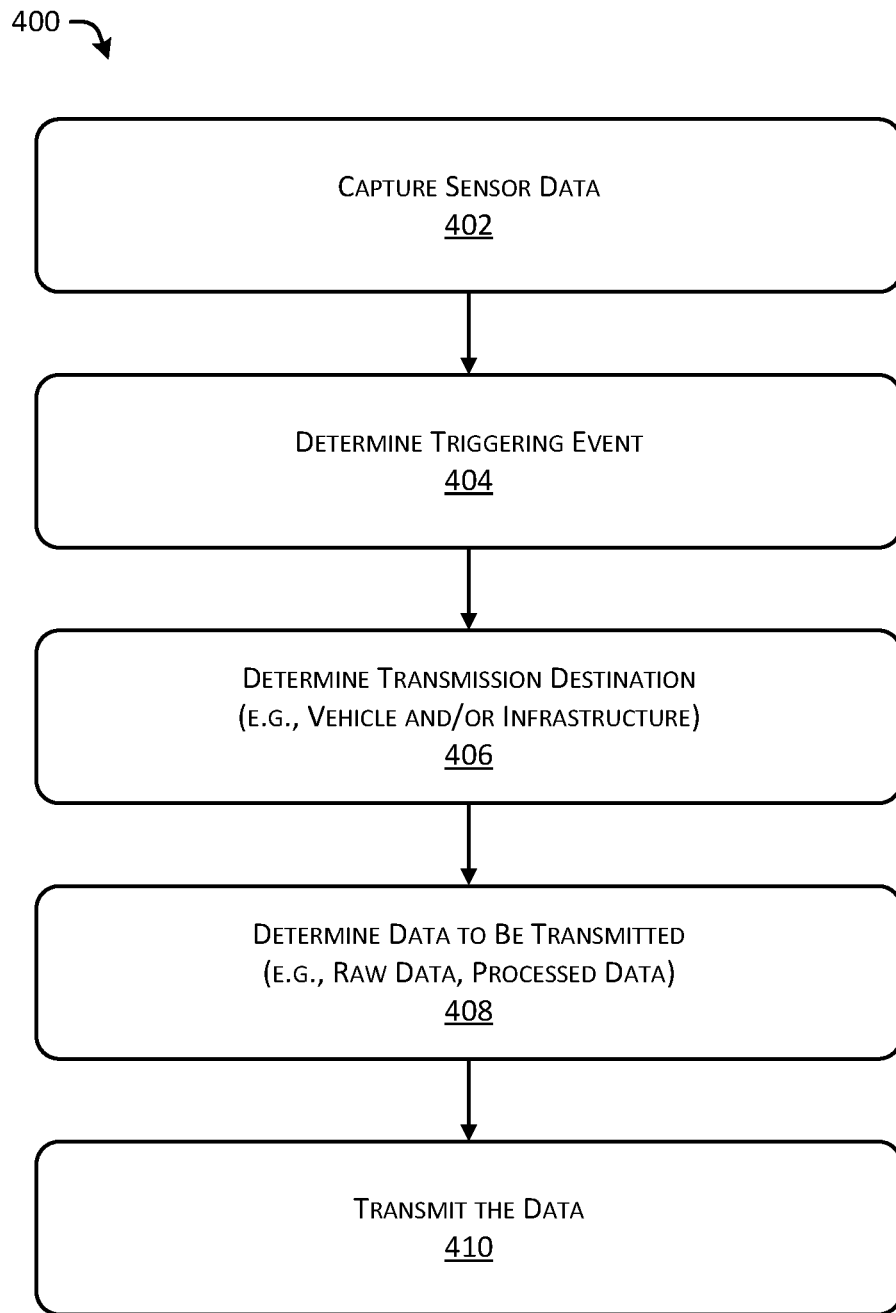
FIG. 4 depicts an example process for capturing sensor data for transmission to other vehicles and/or the central server.
Figure 5:
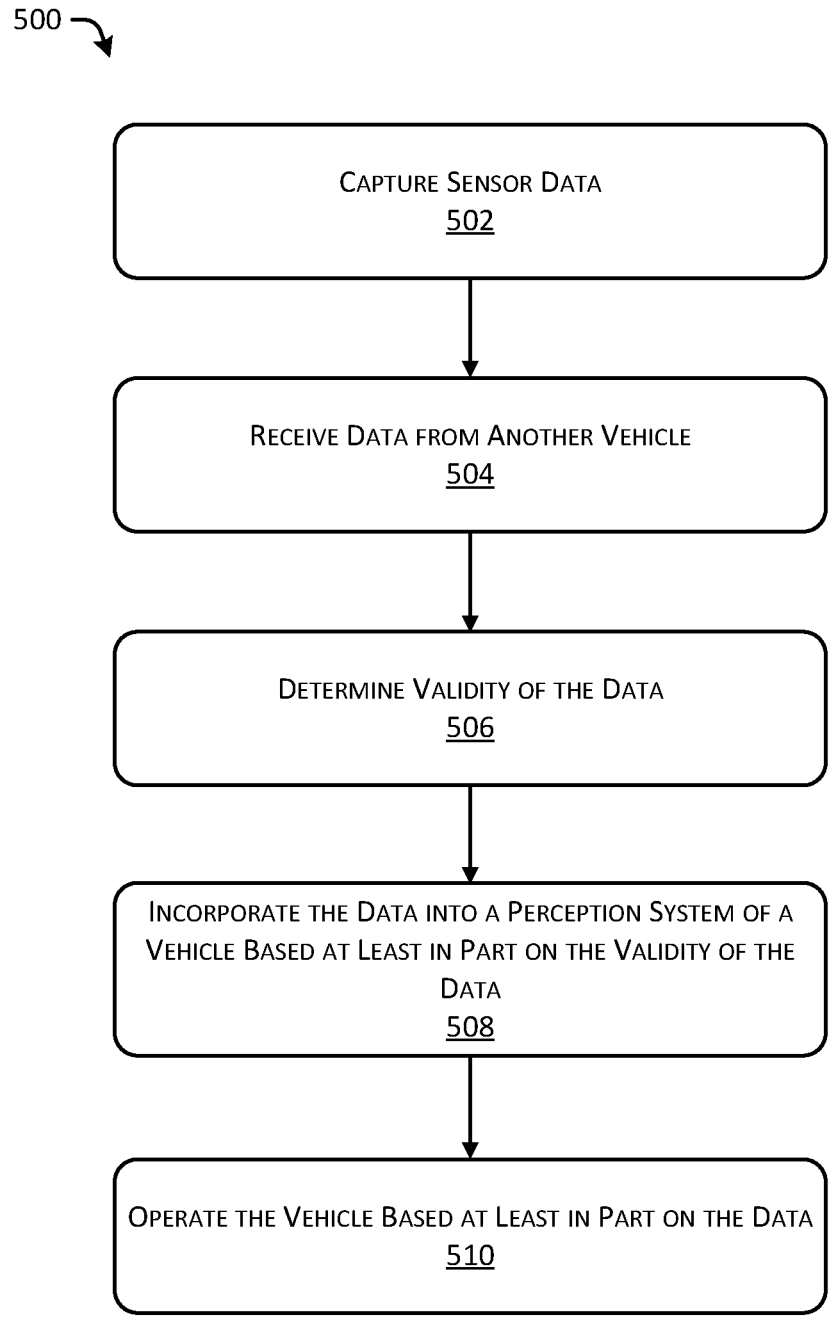
FIG. 5 depicts an example process for receiving obstacle data at a vehicle and incorporating the received obstacle data into operation of the vehicle.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 depicts an example process 400 for capturing sensor data for transmission to other vehicles, infrastructure components (e.g., the sensor 240) and/or the central server, as described herein. For example, some or all of the process 400 can be performed by one or more components in the architecture 300, or in the environments 100, 200, or 600, as described herein.

At operation 402, the process can include capturing sensor data. As discussed herein, in some embodiments, sensor data may include, but is not limited to LIDAR data, camera data, RADAR data, SONAR data, IMU data, GPS data, etc. In some instances, LIDAR data may include data captured from a plurality of LIDAR sensors and may be fused to determine a meta spin.

At operation 404, the process can include determining a triggering event. For example, a triggering event may include acceleration in a direction above a threshold acceleration value, which may correspond to braking or swerving of a vehicle. In some instances, the triggering event may include a collision, near-collision, a predicted collision, traffic law violations, etc. In some instances, triggering events may include detection of a particularly beautiful sunset, crowds of people, protests, demonstrations, the presence of food trucks, etc. That is, the autonomous vehicle may detect (e.g., using the perception system discussed herein) one or more events using segmentation and/or classification techniques to detect events. In some instances, as discussed herein, transmissions and/or data included in transmissions may be based on and/or in response to the triggering event. In some instances, a triggering event may be unnecessary, as a vehicle may be continuously or periodically transmitting information to other vehicles and/or infrastructure devices.

At operation 406, the process can include determining a transmission destination. For example, the transmission destination may be other vehicles and/or infrastructure devices (such as the central server(s) 216, sensor(s) 240, etc.). In some instances, the operation 406 may further include determining metadata associated with a transmission that may be used by receiving entities (e.g., vehicles and/or infrastructure) to determine if the information is relevant to the receiving entity. For example, the operation 406 may include determining a location, time, direction of travel, lane position, etc., of the transmitting vehicle, which may be used, in part, to determine a transmission destination. In some instances, the operation 406 can include encrypting the transmission so that particular vehicles and/or infrastructure devices can receive the transmission. In some instances, the operation 406 may include determining a transmission power based on a type of event or based on the triggering event, which may impact a transmission range or distance of the data to be transmitted.

At operation 408, the process can include determining the data to be transmitted. For example, the operation 408 can include determining whether raw sensor data and/or processed data is to be transmitted. In some instances, the operation 408 can be based in part on the severity of the obstacle or event represented by the sensor data. For example, determination of a collision may warrant different types/level of detail of information than information regarding a road surface. In some instances, data to be transmitted may include segmentation information (e.g., bounding boxes), classification information (e.g., identification of objects, location of objects, etc.). In some instances, the operation 408 may include establishing a priority level or status of the information (e.g., high priority, low priority, etc.).

At operation 410, the process can include transmitting the data. In some instances, the data can be transmitted using any wireless protocol discussed herein. In some instances, the operation 410 may include retransmitting information over time, or transmitting updated information associated with a previous transmission. In some instances, the operation may include requesting an acknowledgement from one or more receiving devices (e.g., vehicles or infrastructure) to confirm receipt of the data.

FIG. 5 depicts an example process 500 for receiving obstacle data at a vehicle and incorporating the received obstacle data into operation of the vehicle. For example, some or all of the process 500 can be performed by one or more components in the architecture 300, or in the environments 100, 200, or 600, as described herein.

At operation 502, the process can include capturing sensor data. In some instances, a vehicle performing the operation 502 may have any number and/or type of sensors, as discussed herein.

At operation 504, the process can include receiving data from another vehicle. In some instances, the data received in the operation 504 may correspond to the data transmitted in the operation 410, as discussed above.

At operation 506, the process can include determining the validity of the data (e.g., received in the operation 504). In some instances, the validity of the data can be based in part on an elapsed time (e.g., between original transmission and reception, between creation of the data and reception, etc.), distance between the receiving vehicle and the source of the transmission, a type of sensor data (e.g., LIDAR data, camera data, etc.), a number of intermediate transmissions (e.g., hop count), a number of duplicate messages received (corresponding to a single originating source), a number of sources corroborating the data (e.g., multiple sources reporting the same event/obstacle), etc. In some instances, the validity of the data may be based on a state of the receiving vehicle. For example, the receiving vehicle may have lower-quality sensors that the sensors capturing the received data, in which case, a validity of the data may be relatively high. In the opposite embodiment, the validity of the data may be relatively lower. In some instances, the validity of the data may decay linearly, exponentially, or may be based on any decay algorithm.

At operation 508, the process can include incorporating the data into a perception system of a vehicle based at least in part on the validity of the data. As discussed herein, a perception system of the vehicle can correspond to any sensors and algorithms utilized by an autonomous vehicle, for example, to perceive objects and events in an environment around the vehicle. In some instances, the perception system can receive data, determine objects (e.g., other vehicles on the road, free space, lane markings, etc.) and can determine a trajectory for the autonomous vehicle to follow. The received data can be incorporated as an input to the perception system, and the data can be incorporated into decision processes (or rejected) based on the validity of the data.

At operation 510, the process can include operating the vehicle based at least in part on the data. For example, the operation 510 can include determining a route or trajectory for the vehicle, and generating commands (e.g., forward acceleration, braking, steering angle, etc.) to navigate the vehicle in accordance with the command. Further, the operation 510 may include retransmitting at least a portion of the data received in the operation 504 to other vehicles or infrastructure that may have been out of range of the original transmission from the originating vehicle.

Figure 6:
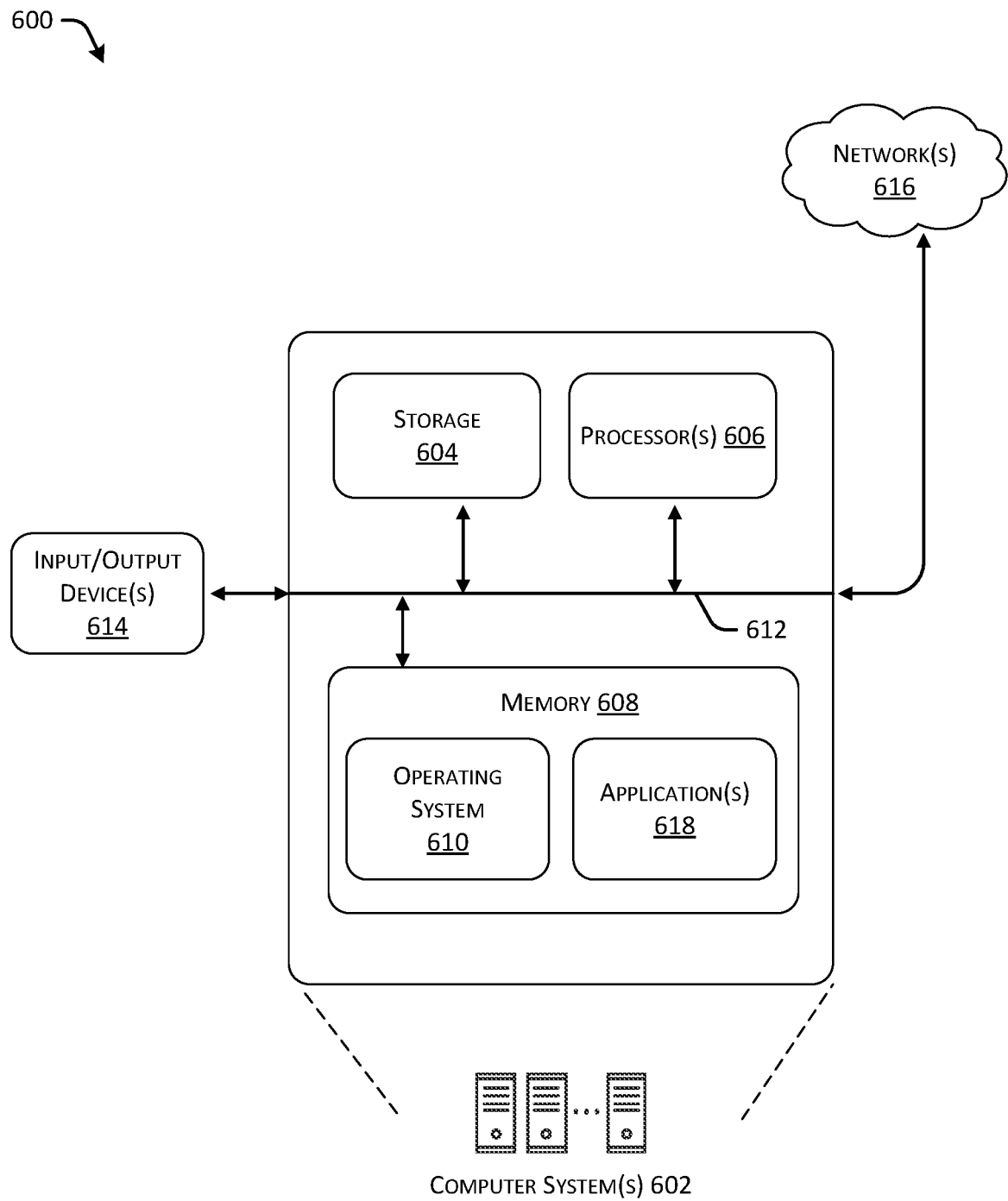
FIG. 6 depicts a block diagram of an example computer system for implementing the techniques described herein.

FIG. 6 illustrates an environment 600 in which the disclosures may be implemented in whole or in part. The environment 600 depicts one or more computer systems 602 that comprise a storage 604, one or more processor(s) 606, a memory 608, and an operating system 610. The storage 604, the processor(s) 606, the memory 608, and the operating system 610 may be communicatively coupled over a communication infrastructure 612. Optionally, the computer system 602 may interact with a user, or environment, via input/output (I/O) device(s) 614, as well as one or more other computing devices over a network 616, via the communication infrastructure 612. The operating system 610 may interact with other components to control one or more applications 618.

In some instances, the computer system(s) 602 may correspond to the computer system(s) 302 of FIG. 3. Further, the computer system(s) 302 may implement any hardware and/or software to implement the modules 304, 306, 308, 310, 312, 314, 316, 318, 320, 322, 324, and to share vehicle data (or sensor data), as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods described herein is illustrated in FIG. 6. A processor or computer system can be configured to particularly perform some or all of the methods described herein. In some embodiments, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™ However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc., can be stored in tables in the RDBMS. The tables can have predefined relationships between them. The tables can also have adjuncts associated with the coordinates.

In alternative exemplary embodiments, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™ JAVA™, C++, C, C #, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some implementations the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A system comprising: one or more processors; and one or more computer readable storage media communicatively coupled to the one or more processors and storing instructions that are executable by the one or more processors to: capture first sensor data from one or more sensors, the one or more sensors including one or more LIDAR sensors, one or more cameras, one or more RADAR sensors, one or more SONAR sensors, or one or more GPS sensors, the first sensor data representing a first environment; receive second sensor data from a remote system, the second sensor data representing a second environment that is separate from the first environment; determine a validity of the second sensor data based at least in part on at least one of a timestamp associated with the second sensor data, a distance between a first location associated with the one or more sensors and a second location associated with the second sensor data, or a type of sensor capturing the second sensor data; and generate a trajectory for an autonomous vehicle based at least in part on the first sensor data, the second sensor data, and the validity of the second sensor data.

B. The system as paragraph A recites, wherein the second sensor data includes at least segmentation information associated with an obstacle or an event associated with the second environment.

C. The system as paragraph A or B recites, wherein the remote system is a remote autonomous vehicle, and further wherein the second sensor data includes at least a position and a velocity associated with the remote autonomous vehicle traversing the second environment.

D. The system as any of paragraphs A-C recite, wherein the trajectory includes commands to navigate the autonomous vehicle through at least a portion of the first environment and through at least a portion of the second environment.

E. The system as any one of paragraphs A-D recite, wherein the remote system is a first remote autonomous vehicle, and wherein the instructions are further executable by the one or more processors to: receive third sensor data from a second remote autonomous vehicle that is different from the autonomous vehicle; determine that the second sensor data and the third sensor data represent a same object in the second environment; and increase a confidence level associated with a validity of the second sensor data and the third sensor data.

F. The system as any of paragraphs A-E recite, wherein the remote system is a first remote autonomous vehicle, and wherein the instructions are further executable by the one or more processors to: determine that the second sensor data is associated with an obstacle associated with the second environment; receive third sensor data from a second remote autonomous vehicle that is different from the autonomous vehicle; and determine that the third sensor data is associated with the obstacle associated with the second environment.

G. The system as paragraph F recites, wherein the instructions are further executable by the one or more processors to increase a validity of the second sensor data based at least in part on the third sensor data being associated with the obstacle associated with the second environment.

H. The system as any of paragraphs A-G recite, wherein the instructions are further executable by the one or more processors to transmit at least a portion of the second sensor data to one or more other vehicles proximate to the autonomous vehicle.

I. A method comprising: capturing first sensor data from one or more sensors installed in an autonomous vehicle; receiving data associated with a remote autonomous vehicle, the data including one or more of first data associated with a state of the remote autonomous vehicle or second data associated with second sensor data captured by the remote autonomous vehicle; determining a validity of the data; and generating a trajectory of the autonomous vehicle based at least in part on the first sensor data, the data, and the validity of the data.

J. The method as paragraph I recites, wherein the data includes at least the first data associated with the state of the remote autonomous vehicle, and wherein the first data includes at least one of a position of the remote autonomous vehicle, an orientation of the remote autonomous vehicle, a velocity of the remote autonomous vehicle, or a braking status of the remote autonomous vehicle.

K. The method as paragraph I or J recites, wherein the data includes at least the second data associated with the second sensor data captured by the remote autonomous vehicle, and wherein the second sensor data includes at least segmented image data of an environment proximate to the remote autonomous vehicle.

L. The method as paragraph K recites, wherein the second sensor data further includes classification information associated with an obstacle or an event represented by the segmented image data.

M. The method as any of paragraphs I-L recite, further comprising: determining a first location of the autonomous vehicle at a first time associated with receiving the data from the remote autonomous vehicle; determining a second location associated with an origin of the data associated with the autonomous vehicle; determining a distance between the first location and the second location; and determining the validity of the data based at least in part on the distance between the first location and the second location.

N. The method as any of paragraphs I-M recite, further comprising: determining a reception time associated with receiving the data at the autonomous vehicle; determining a generation time associated with a generation of the data by the remote autonomous vehicle; determining a time difference between the reception time and the generation time; and determining the validity of the data based at least in part on the time difference between the reception time and the generation time.

O. An autonomous vehicle comprising: one or more processors; and one or more computer readable storage media communicatively coupled to the one or more processors and storing instructions that are executable by the one or more processors to: capture first sensor data from one or more sensors installed in the autonomous vehicle; receive data associated with a remote autonomous vehicle, the data including one or more of first data associated with a state of the remote autonomous vehicle or second data associated with second sensor data captured by the remote autonomous vehicle; determine a validity of the data; generate a trajectory of the autonomous vehicle based at least in part on the first sensor data, the data, and the validity of the data; and navigate the autonomous vehicle based at least in part on the trajectory.

P. The autonomous vehicle as paragraph O recites, wherein the data includes at least the first data associated with the state of the remote autonomous vehicle, and wherein the first data includes at least one of a position of the remote autonomous vehicle, an orientation of the remote autonomous vehicle, a velocity of the remote autonomous vehicle, or a braking status of the remote autonomous vehicle.

Q. The autonomous vehicle as paragraphs O or P recite, wherein the data includes at least the second data associated with the second sensor data captured by the remote autonomous vehicle, and wherein the second sensor data includes at least segmented image data of an environment proximate to the remote autonomous vehicle and classification information associated with an obstacle or an event represented by the segmented image data.

R. The autonomous vehicle as any of paragraphs O-Q recite, wherein one or more of a quality or a representation of the first sensor data and the second sensor data are different.

S. The autonomous vehicle as any of paragraphs O-R recite, wherein the instructions are further executable by the one or more processors to: determine a first location of the autonomous vehicle at a first time associated with receiving the data from the remote autonomous vehicle; determine a second location associated with an origin of the data associated with the autonomous vehicle; determine a distance between the first location and the second location; and determine the validity of the data based at least in part on the distance between the first location and the second location.

T. The autonomous vehicle as any of paragraphs O-S recite, wherein the instructions are further executable by the one or more processors to: determine a reception time associated with receiving the data at the autonomous vehicle; determine a transmission time associated with a transmission of the data by the remote autonomous vehicle; and determine a time difference between the reception time and the transmission time; and determine the validity of the data based at least in part on the time difference between the reception time and the transmission time.

While paragraphs A-H are described above with respect to a system, it is understood in the context of this document that the content of paragraphs A-H may also be implemented via a method, device, and/or computer storage media. While paragraphs I-N are described above with respect to a method, it is understood in the context of this document that the content of paragraphs I-N may also be implemented via a system, device, and/or computer storage media. While paragraphs O-T are described above with respect to an autonomous vehicle, it is understood in the context of this document that the content of paragraphs O-T may also be implemented via a system, method, device, and/or computer storage media.

What is claimed is:

1. A system comprising:
one or more processors; and
one or more computer readable storage media communicatively coupled to the one or more processors and storing instructions that are executable by the one or more processors to:
capture first sensor data from one or more sensors, the one or more sensors including one or more LIDAR sensors, one or more cameras, one or more RADAR sensors, one or more SONAR sensors, or one or more GPS sensors, the first sensor data representing a first environment;
receive second sensor data from a remote system, the second sensor data representing a second environment that is separate from the first environment, wherein the remote system comprises a vehicle system or an infrastructure system;
determine a confidence level associated with a validity of the second sensor data, the confidence level based at least in part on at least one of a timestamp associated with the second sensor data or a type of sensor capturing the second sensor data;
generate a trajectory for an autonomous vehicle based at least in part on the first sensor data, the second sensor data, and the confidence level associated with the validity of the second sensor data; and
control the autonomous vehicle based at least in part on the trajectory.

2. The system of claim 1, wherein the second sensor data includes at least segmentation information associated with an obstacle or an event associated with the second environment.

3. The system of claim 1, wherein the remote system is a remote autonomous vehicle, and further wherein the second sensor data includes at least a position and a velocity associated with the remote autonomous vehicle traversing the second environment.

4. The system of claim 1, wherein the trajectory includes commands to control the autonomous vehicle through at least a portion of the first environment and through at least a portion of the second environment.

5. The system of claim 1, wherein the remote system is a first remote autonomous vehicle, and wherein the instructions are further executable by the one or more processors to:
receive third sensor data from a second remote autonomous vehicle that is different from the autonomous vehicle;
determine that the second sensor data and the third sensor data represent a same object in the second environment; and
increase a confidence level associated with a validity of the second sensor data and the third sensor data.

6. The system of claim 1, wherein the remote system is a first remote autonomous vehicle, and wherein the instructions are further executable by the one or more processors to:
determine that the second sensor data is associated with an obstacle associated with the second environment;
receive third sensor data from a second remote autonomous vehicle that is different from the autonomous vehicle; and
determine that the third sensor data is associated with the obstacle associated with the second environment.

7. The system of claim 6, wherein the instructions are further executable by the one or more processors to increase the confidence level associated with the validity of the second sensor data based at least in part on the third sensor data being associated with the obstacle associated with the second environment.

8. The system of claim 1, wherein the instructions are further executable by the one or more processors to transmit at least a portion of the second sensor data to one or more other vehicles proximate to the autonomous vehicle.

9. A method comprising:
capturing first sensor data from one or more sensors installed in an autonomous vehicle;
receiving data associated with a remote autonomous vehicle, the data including one or more of first data associated with a state of the remote autonomous vehicle or second data associated with second sensor data captured by the remote autonomous vehicle;
determining a confidence level associated with a validity of the data;
generating a trajectory of the autonomous vehicle based at least in part on the first sensor data, the data, and the confidence level associated with the validity of the data; and
controlling the autonomous vehicle based at least in part on the trajectory.

10. The method of claim 9, wherein the data includes at least the first data associated with the state of the remote autonomous vehicle, and wherein the first data includes at least one of a position of the remote autonomous vehicle, an orientation of the remote autonomous vehicle, a velocity of the remote autonomous vehicle, or a braking status of the remote autonomous vehicle.

11. The method of claim 9, wherein the data includes at least the second data associated with the second sensor data captured by the remote autonomous vehicle, and wherein the second sensor data includes at least segmented image data of an environment proximate to the remote autonomous vehicle.

12. The method of claim 11, wherein the second sensor data further includes classification information associated with an obstacle or an event represented by the segmented image data.

13. The method of claim 9, further comprising:
determining a reception time associated with receiving the data at the autonomous vehicle;
determining a generation time associated with a generation of the data by the remote autonomous vehicle;
determining a time difference between the reception time and the generation time; and
determining the confidence level associated with the validity of the data based at least in part on the time difference between the reception time and the generation time.

14. The method of claim 9, further comprising:
determining the confidence level associated with the validity of the data based at least in part on a type of the one or more sensors.

15. An autonomous vehicle comprising:
one or more processors; and
one or more computer readable storage media communicatively coupled to the one or more processors and storing instructions that are executable by the one or more processors to:
- capture first sensor data from one or more sensors installed in the autonomous vehicle;
- receive data associated with a remote autonomous vehicle, the data including one or more of first data associated with a state of the remote autonomous vehicle or second data associated with second sensor data captured by the remote autonomous vehicle;
- determine a confidence level associated with a validity of the data;
- generate a trajectory of the autonomous vehicle based at least in part on the first sensor data, the data, and the confidence level associated with the validity of the data; and
- control the autonomous vehicle based at least in part on the trajectory.

16. The autonomous vehicle of claim 15, wherein the data includes at least the first data associated with the state of the remote autonomous vehicle, and wherein the first data includes at least one of a position of the remote autonomous vehicle, an orientation of the remote autonomous vehicle, a velocity of the remote autonomous vehicle, or a braking status of the remote autonomous vehicle.

17. The autonomous vehicle of claim 15, wherein the data includes at least the second data associated with the second sensor data captured by the remote autonomous vehicle, and wherein the second sensor data includes at least segmented image data of an environment proximate to the remote autonomous vehicle and classification information associated with an obstacle or an event represented by the segmented image data.

18. The autonomous vehicle of claim 15, wherein one or more of a quality or a representation of the first sensor data and the second sensor data are different.

19. The autonomous vehicle of claim 15, wherein the instructions are further executable by the one or more processors to:
- determine a reception time associated with receiving the data at the autonomous vehicle;
- determine a transmission time associated with a transmission of the data by the remote autonomous vehicle; and
- determine a time difference between the reception time and the transmission time; and
- determine the confidence level associated with the validity of the data based at least in part on the time difference between the reception time and the transmission time.

20. The autonomous vehicle of claim 15, comprising further instructions that are executable by the one or more processors to determine the confidence level associated with the validity of the data based at least in part on one or more of a number of transmissions associated with the data or a number of retransmissions associated with the data.

* * * * *